United States Patent [19]

Vinokurov et al.

[11] 4,194,137
[45] Mar. 18, 1980

[54] DEVICE FOR DELIVERING CRYOGEN TO ROTARY SUPER-CONDUCTING WINDING OF CRYOGEN-COOLED ELECTRICAL MACHINE

[75] Inventors: Alexandr A. Vinokurov; Gennady S. Gorbunov; Jury S. Popov, all of Novosibirsk; Jury V. Skachkov, Leningrad; Iosif F. Filippov, Leningrad; Gary M. Khutoretsky, Leningrad, all of U.S.S.R.

[73] Assignees: Spetsialnoe Konstruktorskoe Bjuro "Energokhimmash", Novosibirsk; Leningradskoe Proizvodstvennoe Elektromashinostroitelnoe Obiedinenie "Elektrosila", Leningrad, both of U.S.S.R.

[21] Appl. No.: 887,533

[22] Filed: Mar. 17, 1978

[51] Int. Cl.² ............................................. H02K 9/00
[52] U.S. Cl. .................................... 310/52; 62/505; 62/514 R
[58] Field of Search ..................... 62/55, 505, 514 R; 310/52, 54, 58, 65

[56] References Cited

U.S. PATENT DOCUMENTS

| | | | |
|---|---|---|---|
| 3,809,933 | 5/1974 | Sugaware et al. | 310/52 |
| 3,891,875 | 6/1975 | Laskaris | 310/52 |
| 4,036,618 | 7/1977 | Leonard et al. | 62/55 |
| 4,048,529 | 9/1977 | Pomeroy et al. | 62/505 |
| 4,056,745 | 11/1977 | Eckels | 310/52 |

*Primary Examiner*—Ronald C. Capossela
*Attorney, Agent, or Firm*—Lackenback, Lilling & Siegel

[57] ABSTRACT

A device for delivering cryogen to a superconducting winding of a cryogen-cooled electrical machine comprising a pipe articulated along the axis of the electrical machine and intended to deliver cryogen. One end of said pipe is located in a rotary chamber which communicates through channels with the space of the electrical machine, and said space accommodating its superconducting winding. The said chamber accommodates a needle installed along the chamber axis, and the length of said needle is of sufficient length such that in the advanced position of said cryogen delivering pipe said needle reaches the end of the pipe.

The layout of the electrical machine increases the reliability and effectiveness of the device for delivering cryogen to the superconducting winding, simplifies the design of the device and raises the efficiency of the electrical machine.

6 Claims, 3 Drawing Figures

DEVICE FOR DELIVERING CRYOGEN TO ROTARY SUPER-CONDUCTING WINDING OF CRYOGEN-COOLED ELECTRICAL MACHINE

FIELD OF THE INVENTION

The present invention relates to electrical machines and more particularly it relates to cryogen-cooled electrical machines.

BACKGROUND OF THE INVENTION

The electrical machines with a rotary superconducting winding located in the rotor incorporate a cryogenic cooling system of the winding. The cooling agent in this system is constituted by liquid helium cooled to 4.2° K. A distinguishing feature of the process of conveying liquid helium is the possibility of the development of a two-phase flow due to evaporation of a certain part of the liquid caused by friction between the steady stream of the liquid and the rotating parts of the electrical machine.

During conveyance of the steady stream of liquid helium to the rotating parts of the electrical machine, the increased friction raises the vapour content in the mixture, the resistance to its movement and, as a consequence, the temperature of cryogen.

All these factors reduce the power and efficiency of the electrical machine.

Known in the prior art is a device for supplying cryogen to the rotary superconducting winding of a cryogen-cooled electrical machine (see U.S. Pat. No. 3,809,933 of May 7, 1974, U.S.A.).

Known in the prior art is an electrical machine with a cryogenic cooling system (see U.S. Pat. No. 3,809,933, May 7, 1974, U.S.A.).

In this machine, the device for delivering cryogen to a rotary superconducting winding comprises a pipe for delivering a steady stream of cryogen into the space of the electrical machine with the pipe being articulated along the axis of said machine. One end of said pipe is located with a clearance in a rotary chamber which flares out in the direction of cryogen flow, and the rotary chamber communicates with the space of the electrical machine accommodating its superconducting winding.

However, this cryogen-delivering device is not very effective because the stream of cryogen supplied from the pipe into the chamber has a high relative speed of collision with the chamber surface which leads to the formation of a considerable amount of vapour in the cooling agent or cryogen. This vapour is not expelled from the chamber and a large amount of vapor in the cryogen causes a nonequilibrium state of the cryogen and, in the long run, impairs the conditions of cryogen delivery to the superconducting winding and reduces the amount of supplied cryogen.

Besides, there develop convective vortices in the gap between the pipe and the rotary chamber which intensifies the inflow of heat to the cryogen.

BRIEF DESCRIPTION OF THE INVENTION

An object of the invention is to provide a device for delivering cryogen to the rotary superconducting winding of an electrical machine which would be highly effective and reliable.

Another object is to reduce the consumption of cryogen and, as a result, raise the efficiency of the electrical machine.

These and other objects of the invention achieved by providing a cryogen-cooled electrical machine in which in a device for delivering cryogen to the superconducting winding of a cryogen-cooled electrical machine, comprises a pipe for delivering a steady stream of cryogen, articulated along the axis of said electrical machine are one end of said pipe being arranged in a gap or clearance in a rotary chamber which flares out in the direction of cryogen flow and communicates with the space of the electrical machine which accommodates its superconducting winding. There also according is a needle arranged along the axis of the electrical machine and is secured inside the rotary chamber at the cryogen-discharge end. The length of the needle is of sufficient length such that in the advanced position of said cryogen delivering pipe said needle reaches the end of the pipe, and the rotary chamber communicates with the space of the electrical machine accommodating its super-conducting winding through at least two cryogen-supplying channels.

In order to reduce hydraulic losses of liquid coolant it is preferable that the cryogen channels be arranged along a helical line.

It is also highly desirable and good practice to provide a supporting member in close proximity to and coaxilly with the rotary chamber and to make the cryogen-supplying channels in the form of tubes resting on said supporting member.

Other objects and advantages of the present invention will be disclosed in the detailed description of the invention which follows.

BRIEF DESCRIPTION OF THE DRAWINGS

The invention will be made more apparent by way of an example with reference to the accompanying drawings, in which.

DETAILED DESCRIPTION OF THE DRAWINGS

Figure 1:
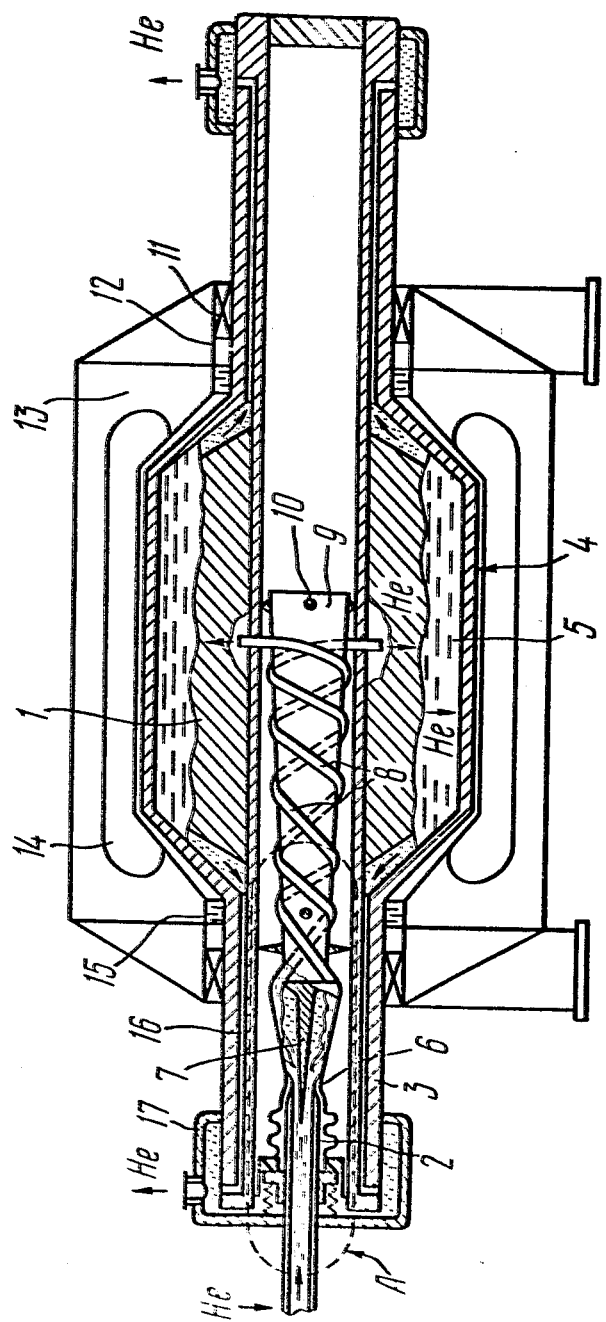
FIG. 1 is a (longitudinal cross-sectional view) of the cryogen-cooled electrical machine of the invention.

In the cryogen-cooled electrical machine, the device for delivering cryogen to a rotary superconducting winding 1 (FIG. 1) comprises a pipe 2 articulated or movable along the axis of the electrical machine in a hole located along the axis of the shaft 3 of a rotor 4 at the end opposite to the drive (not shown in the drawings). The pipe 2 is intended to deliver cryogen 5 consisting of liquid helium at a temperature of 4.2° K. into the space of the electrical machine to the superconducting winding 1.

The end of the pipe 2 is set with a clearance inside the rotary chamber 6. The chamber 6 is mounted coaxially with the pipe 2 and flares out in the direction of flow of cryogen 5 (the direction of cryogen flow is shown by arrows in the drawing).

Fixed inside the chamber 6 at the cryogen-discharge end is a needle 7 oriented along the axis of the electrical machine. The length of the needle 7 is of a sufficient length such that in the advanced position of said cyrogen delivering pipe said needle reaches to the end of the pipe 2 and facilitates controlling the cryogen flow rate in conjunction with said axially movable cryogen-delivering pipe. The space of the chamber 6, communicates with the space of the rotor 4 accommodating the superconducting winding, through helical channels 8 which in this embodiment of the invention have the form of two tubes wound on a supporting member 9 having the shape of a truncated cone. The supporting member 9 is located, in close proximity to and coaxially with the rotary chamber 6, inside the shaft 3 of the rotor 4 and rests on supports 10 which is made from a low heat-conducting material, such as, for example a ceramic of $Al_2O_3$.

The shaft 3 of the rotor 4 rotates in bearings 11 built into the end shields 12 of the sealed frame 13 of the electrical machine, the inside surface of said frame supporting a stator winding 14. The space between the outer surface of the rotor 4 and the frame 13 is vacuumized, and the vacuum serving as a heat insulation of the superconducting winding 1. For maintaining the vacuum, and the end shields 12 accommodate rotary vacuum seals 15 at the side of the superconducting winding 1.

For discharging the used cryogen 5, the space of the rotor 4 is connected by channels 16 passing inside the shaft 3 of the rotor 4 with gas collectors 17 enveloping the ends of the shaft 3.

Figure 2:
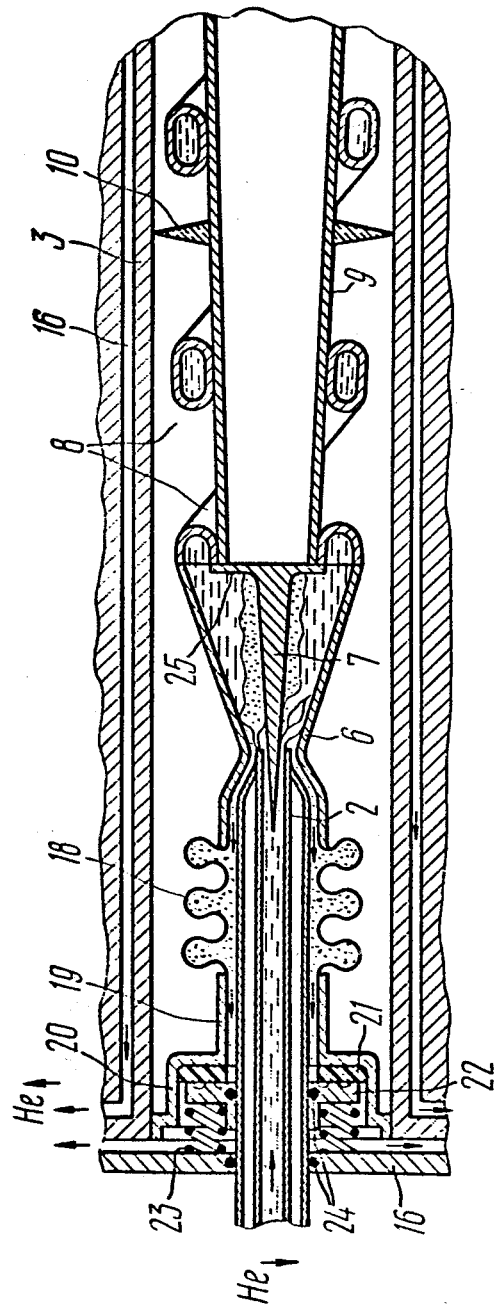
FIG. 2 is an enlarged fragmentary view of the zone or area marked by the letter A in FIG. 1, illustrating the device for delivering cryogen to a rotary superconducting winding of the electrical machine of FIG. 1.

The pipe 2 (FIG. 2) is made in the form of two thin-walled tubes with a vacuum maintained between them. The chamber 6 is of a flaring-out shape and has the profile of a Laval nozzle. The end of the pipe 2 is located in the critical section or neck of such nozzle. The profile of the end of the pipe 2 follows the profile of the chamber 6 which ensures a constant clearance between the pipe and the chamber 6. The chamber 6 is rigidly fixed to the shaft 3 through a thermal joint comprising a bellows 18, a thin-walled pipe 19 and a sleeve 20. The space between the rotary chamber 6 and shaft 3 is vacuumized. The circular gap between the pipe 2 and the thin-walled pipe 19 is sealed at the cryogen-delivery side by an adjustable rotary end seal comprising a rotary ring 21, a fixed ring 22 and a spring 23.

In addition, the end wall of the gas collector 17 and the fixed ring 22 have sliding seals 24 which allow the pipe 2 to move along the axis of the electrical machine and about the concentrically disposed needle 7.

The end wall 25 of the chamber 6 is provided with two elliptical holes 26 (FIG. 3) through which cryogen 5 is delivered from the chamber 6 into the channels 8 delivering cryogen 5 to the superconducting winding 1.

Figure 3:
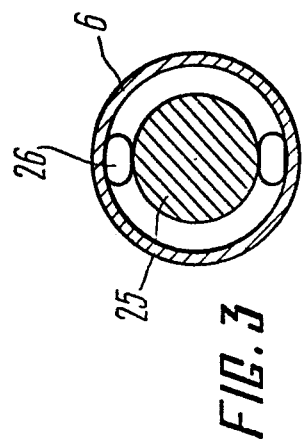
FIG. 3 is a sectional view taken through the end wall of the rotary chamber shown greatly enlarged in FIG. 2.

Cryogen 5 is delivered to the rotary superconducting winding 1 of the electrical machine as follows. Liquid helium at a temperature of 4.2° K. is delivered in a steady stream from a refrigerating machine (not shown in the drawing) into the rotary chamber 6 through the inlet pipe 2 (FIGS. 1, 2) at a nearly atmospheric pressure. To reduce the speed of collision of the steady stream of cryogen 5 with the rotary surface of the chamber 6, said stream is twisted by the rotary needle 7 and thrown towards the walls of the chamber 6. The vapor thus produced is accumulated in the center of the chamber 6. The liquid phase of cryogen 5 fills the end of the chamber 6, completely covering the holes 26 (FIG. 3). Due to the pressure differential, the generated vapor is sucked off through the circular gap between the chamber 6 and the pipe 2 (FIGS. 1, 2) and the adjustable seal into the gas collector 17.

The liquid cryogen 5 is entrained by the helical channels 7 and conveyed into the inside space of the rotor 4 where the superconducting winding 1 is installed. The used cryogen 5 is conducted in the form of cold vapor into the channels 16 of the shaft 3 of the rotor 4 and discharged into the gas collectors 17 mounted on both ends of the shaft 3.

This arrangement of the device for delivering cryogen to the rotary superconducting winding raises its reliability and simplifies the design of the device proper. The trouble-free performance of the machine as a whole depends on the reliability and efficiency of the cryogen-delivering device, both during normal service and at transitional and starting duties.

Therefore, reliability of the above-described cryogendelivering device is an important performance criterion of the machine as a whole.

All other conditions being equal, this layout of the device decreases the generation of vapor both during delivery of the steady cryogen stream to the rotating parts of the electrical machine and while the cryogen is conveyed directly to the superconducting winding. This permits a more efficient cooling of the superconducting winding and reduces the consumption of cryogen for maintaining the superconducting state of the winding at one and the same power rating of the electrical machine. The consumption of cryogen 5 is reduced both due to low generation of vapor in the joint and due to a decreased transfer of heat to cryogen within the entire device. The vapor generated in this device does not enter the channels delivering cryogen to the superconducting winding and, as a consequence, does not heat the cryogen and the winding proper.

All of the factors mentioned above reduce expenditures for maintaining the superconducting state of the winding and for operating the machine, and thus raise the efficiency of the electrical machine as a whole.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

We claim:

1. A cryogen-cooled electrical machine comprising:
   a stator;
   a hollow rotor located in said stator and having two ends;
   a superconducting winding accommodated in said hollow rotor;
   a cryogen-delivering pipe articulated or movable along the axis of said hollow rotor and located at one end of said rotor;
   a chamber located inside of said rotor, coaxially with said cryogen-delivering pipe and connnected rigidly to said rotor;
   one end of said cryogen-delivering pipe, arranged with a clearance inside of said chamber;
   said chamber which is rotatable with said rotor flares out from said end of said pipe and initially causes said cryogen to be swirled therein;

at least two helical channels for delivering swirling cryogen to said superconducting winding, and for communicating said chamber with the space of said rotor which accommodates said superconducting winding; and a needle secured inside of said chamber along its axis, said needle being of sufficient length such that in the advanced position of said cryogen delivering pipe said needle reaches the end of said pipe and facilitates controlling the cryogen flow rate in conjunction with said axially movable cryogen-delivering pipe.

2. An electrical machine according to claim 1, wherein said channels are intended to deliver cryogen to said superconducting winding and are arranged on a helical line.

3. An electrical machine according to claim 2, wherein a supporting member is located in close proximity to and coaxially with said chamber; and includes tubes resting on said supporting member serving as said helical channels for delivering cryogen to said superconducting winding.

4. An electrical machine according to claim 3, wherein said supporting member is in the shape of a hollow, truncated cone, and rests on a plurality of supports, made from a low heat-conducting material, disposed between the inside wall of said hollow rotor and said supporting member.

5. An electrical machine according to claim 3, wherein said helical channels have elliptical passages.

6. An electrical machine according to claim 1, wherein said needle is substantially long and narrow and aids in controlling the cryogen flow rate when said cryogen-delivering pipe is advanced into or retracted from said hollow rotor.

* * * * *